United States Patent [19]

Kawabata

[11] Patent Number: 5,444,977
[45] Date of Patent: Aug. 29, 1995

[54] AIR/FUEL RATIO SENSOR ABNORMALITY DETECTING DEVICE FOR INTERNAL COMBUSTION ENGINE

[75] Inventor: Tsuyoshi Kawabata, Anjo, Japan

[73] Assignee: Nippondenso Co., Ltd., Kariya, Japan

[21] Appl. No.: 143,884

[22] Filed: Nov. 1, 1993

[30] Foreign Application Priority Data

Nov. 2, 1992 [JP] Japan .................................. 4-294523
Aug. 30, 1993 [JP] Japan .................................. 5-214416

[51] Int. Cl.⁶ ............................................. F01N 3/20
[52] U.S. Cl. ......................................... 60/276; 60/285; 60/287
[58] Field of Search ............... 60/274, 276, 285, 287; 123/417, 492, 703

[56] References Cited

U.S. PATENT DOCUMENTS

| | | | |
|---|---|---|---|
| 4,908,765 | 3/1990 | Murakami et al. | 123/492 |
| 5,022,225 | 6/1991 | Sawada | 60/274 |
| 5,228,286 | 7/1993 | Demura | 60/276 |
| 5,277,161 | 1/1994 | Endou | 123/417 |

FOREIGN PATENT DOCUMENTS 63-239333 10/1988 Japan .

Primary Examiner—Ira S. Lazarus
Assistant Examiner—Daniel J. O'Connor
Attorney, Agent, or Firm—Cushman, Darby & Cushman

[57] ABSTRACT

An air/fuel ratio sensor abnormality detecting device avoiding influence of degradation of $O_2$ storage effect of a catalyst due to deterioration, includes linear air/fuel ratio sensors for linearly detecting the air/fuel ratio being employed as upstream side and downstream side air/fuel ratio sensors, delay period deriving means for deriving a gas response delay period between the both air/fuel ratio sensors on the basis of the results of detection of the upstream side and downstream side air/fuel ratio sensors while the air/fuel ratio feedback control is effected under lean condition of the air/fuel ratio, and abnormality detecting means for detecting abnormality of the downstream side air/fuel ratio sensor on the basis of the derived delay period. Since the gas response delay period is derived on the basis of the results of detection in the upstream and downstream side linear air/fuel ratio sensors in a air/fuel ratio lean range which is not influenced by the $O_2$ storage effect, the derived delay period is not influenced by the deterioration condition of the catalyst so that the abnormality detection for the downstream side linear air/flow rate sensor can be done with high accuracy. By employing the linear air/fuel ratio sensors, stable lean condition can be realized.

4 Claims, 12 Drawing Sheets

AIR/FUEL RATIO SENSOR ABNORMALITY DETECTING DEVICE FOR INTERNAL COMBUSTION ENGINE

BACKGROUND OF THE INVENTION

The present invention relates to an air/fuel ratio sensor abnormality detecting device for an internal combustion engine. More specifically, the invention relates to an air/fuel ratio sensor abnormality detecting device for detecting abnormality of a downstream side air/fuel ratio sensor in an internal combustion engine which is provided with air/fuel ratio sensors disposed in an exhaust passage at upstream and downstream of a catalytic converter for performing an air/fuel ratio control on the basis of the results of detection by the air/fuel ratio sensors.

Conventionally, in order to improve purification efficiency of an anti-pollution unit, such as catalytic converter disposed in an exhaust system or to improve fuel economy, an internal combustion engine is provided with an upstream side air/fuel ratio sensor at a position upstream of the catalytic converter for performing feedback control of an air/fuel ratio. The upstream side air/fuel ratio arranged upstream of the catalytic converter tends to easily deteriorate due to its being subjected to high temperatures. Therefore, another downstream side air/fuel ratio sensor is provided downstream of the catalytic converter to establish a dual sensor system and to monitor the operation of the upstream side air/fuel ratio sensor to perform correction to better condition the purification performance of the catalytic converter.

Technology for detecting abnormality of the downstream side air/fuel ratio sensor due to deterioration, or the like, on the basis of a difference in the response period between the upstream side air/fuel ratio sensor and the downstream side air/fuel ratio sensor upon fuel cut-off has been proposed in Japanese Unexamined Patent Publication No. 63-239333. Namely, at the occurrence of fuel cut-off in the internal combustion engine, an elapsed time from a time at which the output of the upstream side air/fuel ratio sensor indicates a lean mixture condition, to a time at which the output of the downstream side air/fuel ratio sensor indicates the lean mixture condition so that abnormality is judged when the response timing difference is in excess of a predetermined period. This technology is based on the fact that the response timing difference becomes greater when the response characteristics of the downstream side air/fuel ratio sensor is degraded due to deterioration.

In this case, however, the deterioration condition of the catalytic converter is not taken into account for the setting of the predetermined period giving the reference for comparison. At a certain occasion, even when the response characteristics of the downstream side air/fuel mixture sensor is degraded due to deterioration of the sensor under the deterioration condition of the catalytic converter, the difference of the response timing at the upstream and downstream of the catalytic converter can be held unchanged from that of the normal states of the catalytic converter and the air/fuel ratio sensors. This relates to reduction of $O_2$ storage effect of the catalyst due to deterioration.

Further discussion will be given for the $O_2$ storage effect. The $O_2$ storage effect is an effect that enables storage of $O_2$ during lean condition of the air/fuel ratio (the condition where the air/fuel ratio is greater than a stoichiometric value) and which discharges the stored $O_2$ for awhile for promoting oxidation after variation of the air/fuel ratio into a rich condition. This $O_2$ storage effect is effective for storing $O_2$ even when the air/fuel ratio is in a slightly lean condition in relation to the stoichiometric air/fuel ratio (A/F=14.7), as shown in FIG. 2. On the other hand, a storage amount of $O_2$ of the catalyst is at a greater level in new and (not deteriorated) normal catalyst, and is reduced according to progress of deterioration.

Accordingly, when the $O_2$ storage effect is lowered due to deterioration of the catalyst, a difference of response timing between upstream and downstream of the catalytic converter upon variation of the outputs (from rich state to lean state) of the air/fuel ratio sensors is shorter than that in the normal state of the catalytic converter. This may compensate degradation of the response characteristics of the downstream side air/fuel ratio sensor to make the total response period unchanged from the normal state. As can be appreciated herefrom, deterioration of the catalyst makes it difficult to detect deterioration of the air/fuel ratio sensor and may possibly cause erroneous judgement at a certain setting of the response timing difference. Therefore, there has been a need to provide for accuracy of detection of an abnormality in the air/fuel ratio sensor.

SUMMARY OF THE INVENTION

It is therefore an object of the present invention to provide an air/fuel ratio sensor abnormality detecting device for an internal combustion engine, which can avoid the influence of degradation from the $O_2$ storage effect of a catalyst due to deterioration in judgement of abnormality of an air/fuel ratio sensor positioned downstream of a catalytic converter.

According to one aspect of the invention, as exemplified in the illustration of a basic construction in FIG. 1, in an internal combustion engine having a catalytic converter arranged in an exhaust passage of the internal combustion engine for exhaust purification, there is provided an upstream side air/fuel ratio sensor arranged in the exhaust passage upstream of the catalytic converter for detecting an air/fuel ratio in the internal combustion engine, a downstream side air/fuel ratio sensor arranged in the exhaust passage downstream of the catalytic converter for detecting an air/fuel ratio in the internal combustion engine, and control means for performing an air/fuel ratio feedback control on the basis of results of detection of both air/fuel ratio sensors, an air/fuel ratio sensor abnormality detecting device for detecting abnormality of the downstream side air/fuel ratio sensor comprises linear air/fuel ratio sensors for linearly detecting the air/fuel ratio being employed as the upstream side and downstream side air/fuel ratio sensors, delay period deriving means for deriving a gas response delay period between the both air/fuel ratio sensors on the basis of the results of detection of the upstream side and downstream side air/fuel ratio sensors while the air/fuel ratio feedback control is effected under lean condition of the air/fuel ratio, and abnormality detecting means for detecting abnormality of the downstream side air/fuel ratio sensor on the basis of the derived delay period.

In the air/fuel ratio sensor abnormality detecting device for an internal combustion engine as constructed above in accordance with the present invention, the delay period deriving means derives the gas response delay period between the both air/fuel ratio sensors on the basis of the results of detection of the upstream side and downstream side air/fuel ratio sensors while the air/fuel ratio feedback control is effected under lean condition of the air/fuel ratio, and the abnormality detecting means detects abnormality of the downstream side air/fuel ratio sensor on the basis of the derived delay period.

With the construction set forth above, since the gas response delay period is derived on the basis of the results of detection in the upstream and downstream side linear air/fuel ratio sensors in a air/fuel ratio lean range which is not influenced by the $O_2$ storage effect, the derived delay period is not influenced by the deterioration condition of the catalyst so that the abnormality detection for the downstream side linear air/flow rate sensor can be effected with high accuracy. In addition, since the linear air/fuel ratio sensors can linearly detect the air/fuel ratio, stable lean condition can be realized to improve exactness of the abnormality detection.

DESCRIPTION OF THE PREFERRED EMBODIMENT

Figure 1:
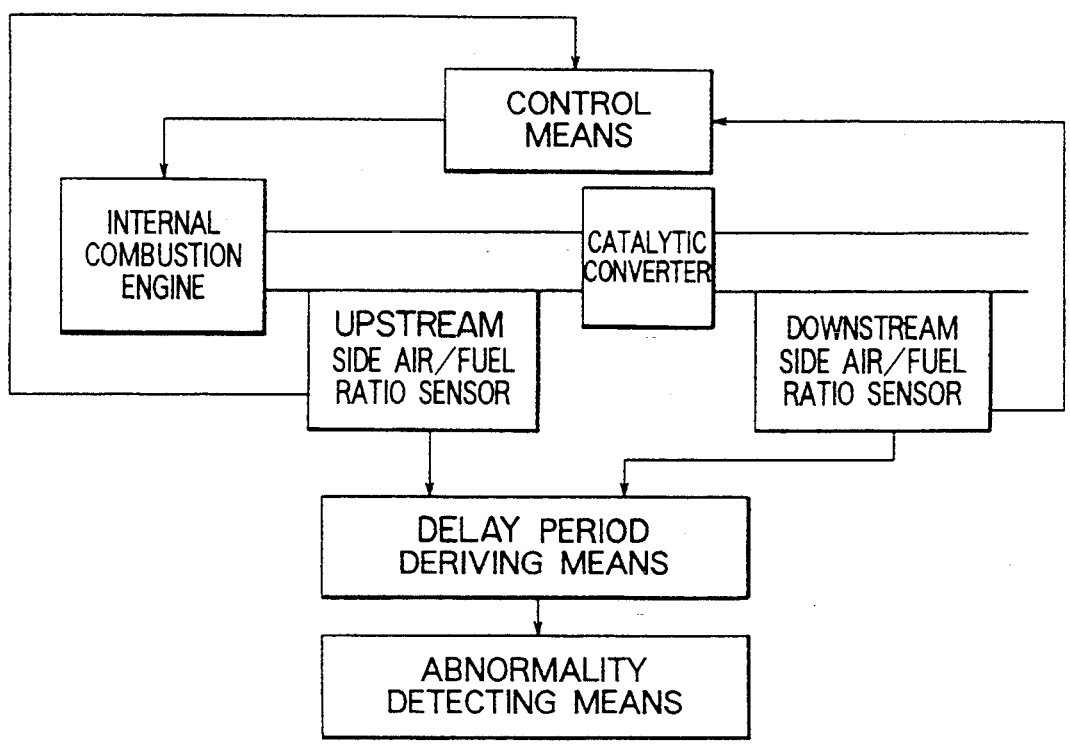
FIG. 1 is a block diagram showing a basic construction of the present invention.
Figure 2:
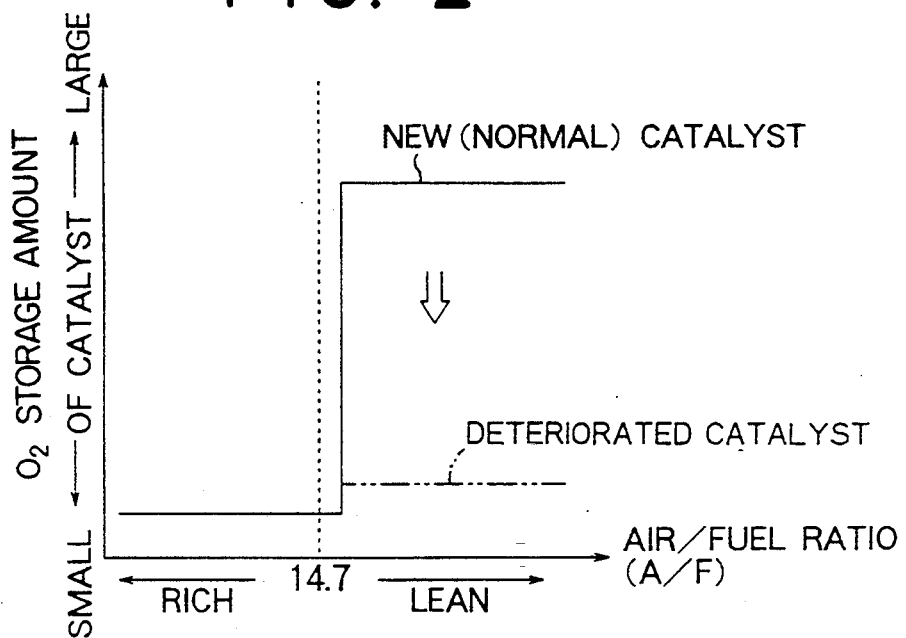
FIG. 2 is a graph showing a relationship between an air/fuel ratio and an $O_2$ storage effect of a catalyst.
Figure 3:
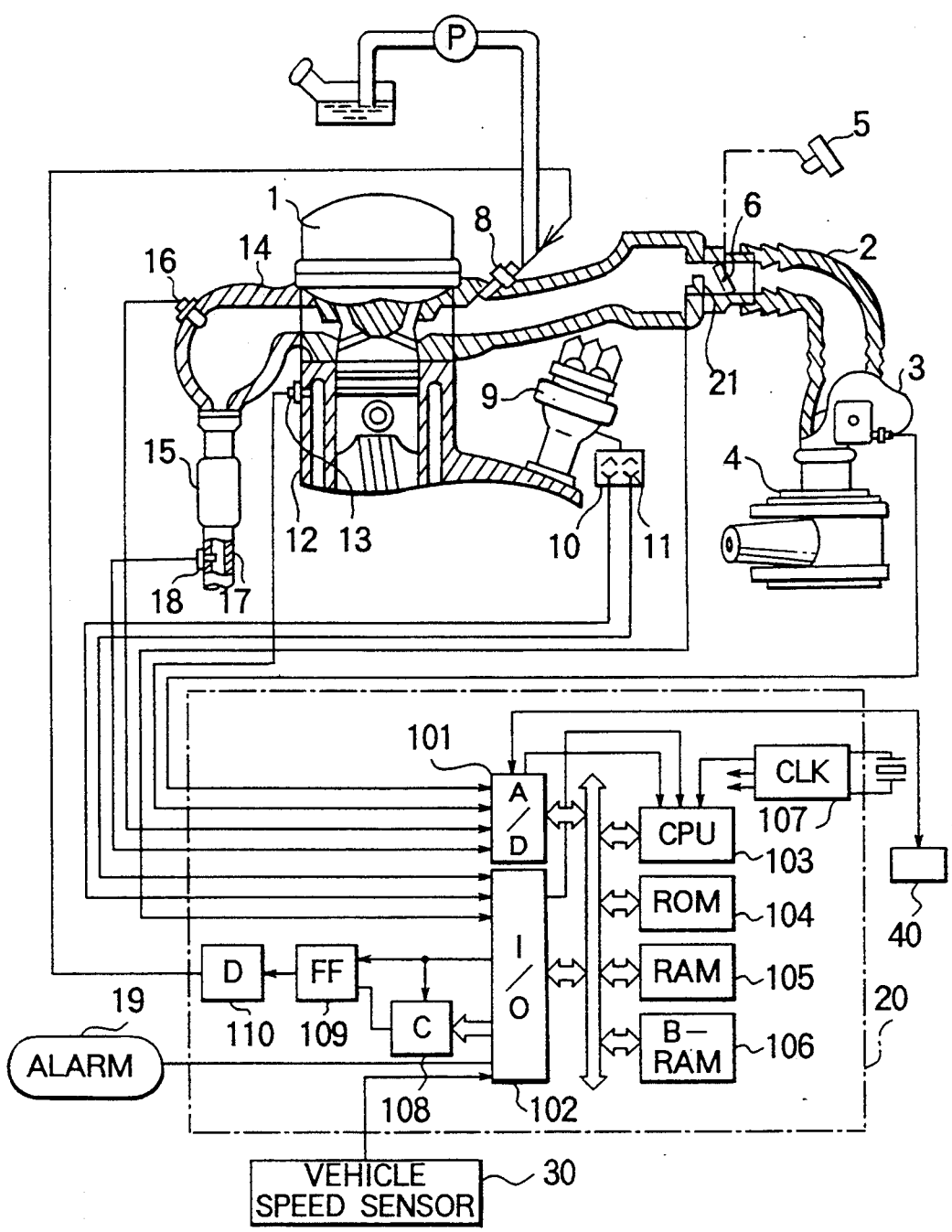
FIG. 3 is a diagrammatic illustration showing overall construction of one embodiment of an air/fuel ratio sensor abnormality detecting device according to the invention.

FIG. 3 is a diagrammatic illustration showing the overall construction of one embodiment of an air/fuel ratio sensor abnormality detecting device for an internal combustion engine, according to the present invention. In FIG. 3, an air flow meter 3 is disposed within an air induction passage 2 of an engine body 1. The air flow meter 3 is designed to directly measure an intake air flow rate Q and incorporates a potentiometer to generate an output signal in the form of an analog voltage signal proportional to the intake air flow rate. The output signal is supplied to an A/D converter 101 incorporating a multiplexer in a control circuit 20. Also, a voltage of a battery 40 is supplied to the A/D converter 101 as an output signal.

A crank angle sensor 10 for generating a pulse signal for detecting a reference position at every 720° of crank angular displacement, and a crank angle sensor 11 for generating a pulse signal for detecting a reference position at every 30° of crank angular displacement are coupled with a distributer for co-rotation with a shaft of the distributer to detect crank shaft angular positions. The pulse signals of these crank angle sensors 10, 11 are supplied to an input/output interface 102 of the control circuit 20. Among these, the output of the crank angle sensor 11 is connected to an interruption terminal of a CPU 103. On the other hand, an output signal of a vehicle speed sensor 30 is also supplied to the input/output interface 102.

For the air induction passage 2, fuel injection valves 8 for supplying pressurized fuel to respective suction ports of respective engine cylinders from a fuel supply system are provided.

On the other hand, an engine coolant temperature sensor 13 for monitoring an engine coolant temperature THW is disposed within a water jacket 12 in within an engine cylinder block of the engine body 1. The engine coolant temperature sensor 13 outputs an electric signal in a form of an analog voltage signal corresponding to the engine coolant temperature THW. This output is also supplied to the A/D converter 101.

In an exhaust system downstream of an exhaust manifold 14, a catalytic converter 15, in which a catalyst for simultaneous purifying three pollutants, i.e. C, CO and $NO_x$, in an exhaust gas, is provided.

In the exhaust manifold 14, upstream of the catalytic converter, an upstream side linear air/fuel ratio sensor 16 is disposed. On the other hand, downstream of the catalytic converter 15, a downstream side linear air/fuel ratio sensor 18 is disposed within an exhaust pipe 17. Both linear air/fuel ratio sensors 16 and 18 generate detection signals (sensor currents) corresponding to oxygen concentration in the exhaust gas.

Further discussion will be given to linear air/fuel ratio sensors 16, 18. Since the upstream side and downstream side of air/fuel ratio sensors 16, 18 are of identical constructions, further discussion will refer only to the upstream side air/fuel ratio sensor 16, with reference to FIG. 4. The shown air/fuel ratio sensor 16 has a sensor element which can be heated by a heater. Utilizing the battery 40 as a power source, the power supplied to the heater can be controlled. A heater voltage and heater current to be applied to the heater is input to the A/D converter 101 of the control circuit 20 so that CPU 103 may detect them. On the other hand, in order to obtain a sensor current output from the sensor element depending upon the air/fuel ratio, a voltage (potential difference) between respective ends of predetermined resistor is input to the A/D converter 101 of the control circuit 20 so that CPU 103 may detect it.

Figure 4:
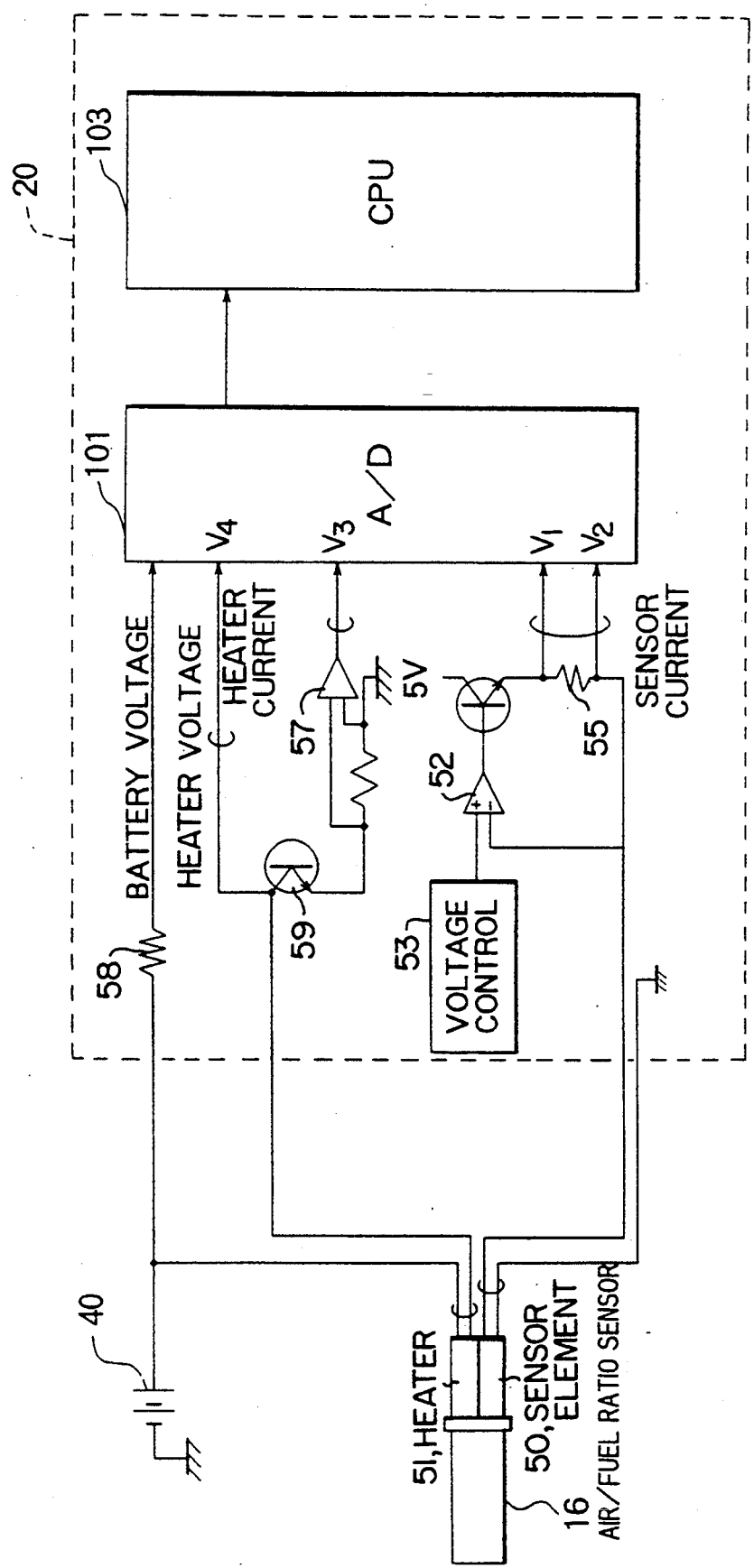
FIG. 4 is a circuit diagram for explaining a construction in the shown embodiment associated with the air/fuel ratio sensor.

The arrangement in FIG. 4 is commonly known to those skilled in the art. For example, the arrangement of FIG. 4 is disclosed by U.S. Pat. No. 4,611,562. For convenience sake, a brief description of this configuration will now be provided. Control circuit 20 controls electric power supplied to the heater 51 of the sensor 16 and voltage applied to sensor-element 50 of the sensor 16. The control circuit 20 includes a differential amplifier 52 for receiving a constant voltage applied from a voltage control 53 in order to operate transistor 54 to apply a predetermined control voltage to the sensor element 50 of the sensor 16. A/D converter 101 includes a multiplexer, (operating with a voltage provided from circuit 52), and receives a reference voltage signal of a predetermined value V1, a lowered voltage signal V2 voltage-dropped by a sensor-current detection resistor 55 in response to a heater current of heater 51, a voltage signal V3 voltage-dropped by a heater current detection resistor 56 and amplified by a differential amplifier, an input power voltage (heater voltage) signal V4 and a battery voltage signal voltage-dropped by a given resistor 58. The voltage difference between the two voltage signals V1 and V2 is a voltage drop of the sensor current detection resistor 55 and represents an oxygen concentration of exhaust gas detected by sensor element 50 of the air-fuel ratio sensor 16. Thus, CPU 103 detects the voltage difference to compute a corresponding air-fuel ratio. Because sensor element 50 allows sensor current to flow stably in correspondence with the oxygen concentration when the sensor element 50 is heated at a temperature higher than a predetermined temperature, transistor 59 is adapted to be on-off controlled, thereby controlling the supply of heating electric power. More specifically, the control of the heat sensing power is effected by the on-off control of the transistor 59 with a target heating power computed by CPU 103 on the basis of the received voltage signals V3 and V4.

Returning to FIG. 3, there is shown a throttle valve 6 disposed in the air induction passage 2, and an idle switch 21 for detecting whether the throttle valve 6 is at a substantially fully closed position or not. The output signal of the idle switch 21 is supplied to the input/output interface 102 of the control circuit 20. 19 denotes an alarm for indicating degradation of a response characteristics of the downstream side linear air/fuel ratio sensor 18.

The control circuit 20 comprises a microcomputer, for example, and includes the A/D converter 101, the input/output interface 102, CPU 103, and in addition thereto a ROM 104, a RAM 105, a back-up RAM 106, a clock generating circuit 107 and so forth.

On the other hand, in the control circuit 20, a down-counter 108, a flip-flop 109 and a driver circuit 110 are adapted to control the fuel injection valves 8. Namely, when a fuel injection period TAU is derived, the fuel injection period TAU is preset in the down-counter 108. At the same time, the flip-flop 109 is set so that the driver circuit 110 initiate actuation of the fuel injection valve 8.

The down-counter 108 counts down a clock signal (not shown). When a level of a carry out terminal of the down-counter 108 becomes "1" level, the flip-flop 109 is reset so that the driver circuit 110 terminates actuation of the fuel injection valve 8. Namely, the fuel injection valve 8 is actuated for the fuel injection period TAU so that a fuel amount corresponding to the fuel injection period TAU is supplied into a combustion chamber of the engine body 1.

Interruption of CPU 102 is caused upon completion of A/D conversion by the A/D converter 101, upon reception of the pulse signal of the crank angle sensor 11 at the input/output interface 102, upon reception of an interrupt signal from a clock generating circuit 107, and so forth.

Intake air flow rate data Q from the air flow meter 3 and an engine coolant temperature data THW are read in RAM 105 through an A/D conversion routine executed every given interval and stored in a predetermined region. Namely, in RAM 105, the intake air flow rate data Q and the engine coolant temperature data THW are updated at the every given interval. On the other hand, engine speed data NE is calculated by interruption at every 30° CA of the crank angle sensor 11 and stored in a predetermined region in RAM 105.

Figure 5:
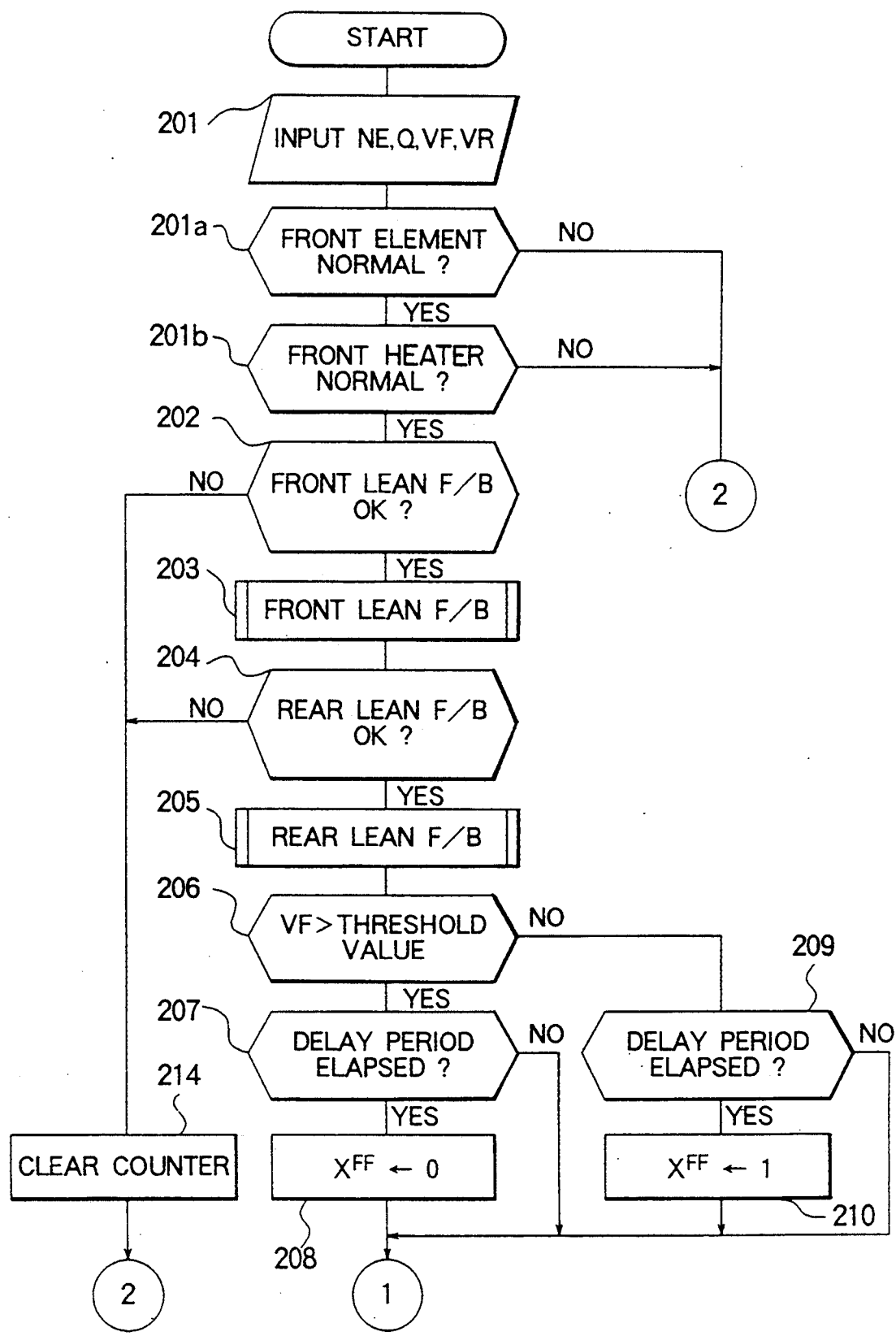
FIG. 5 is a flowchart of a front half of a sensor abnormality detecting routine to be executed in a control circuit.
Figure 6:
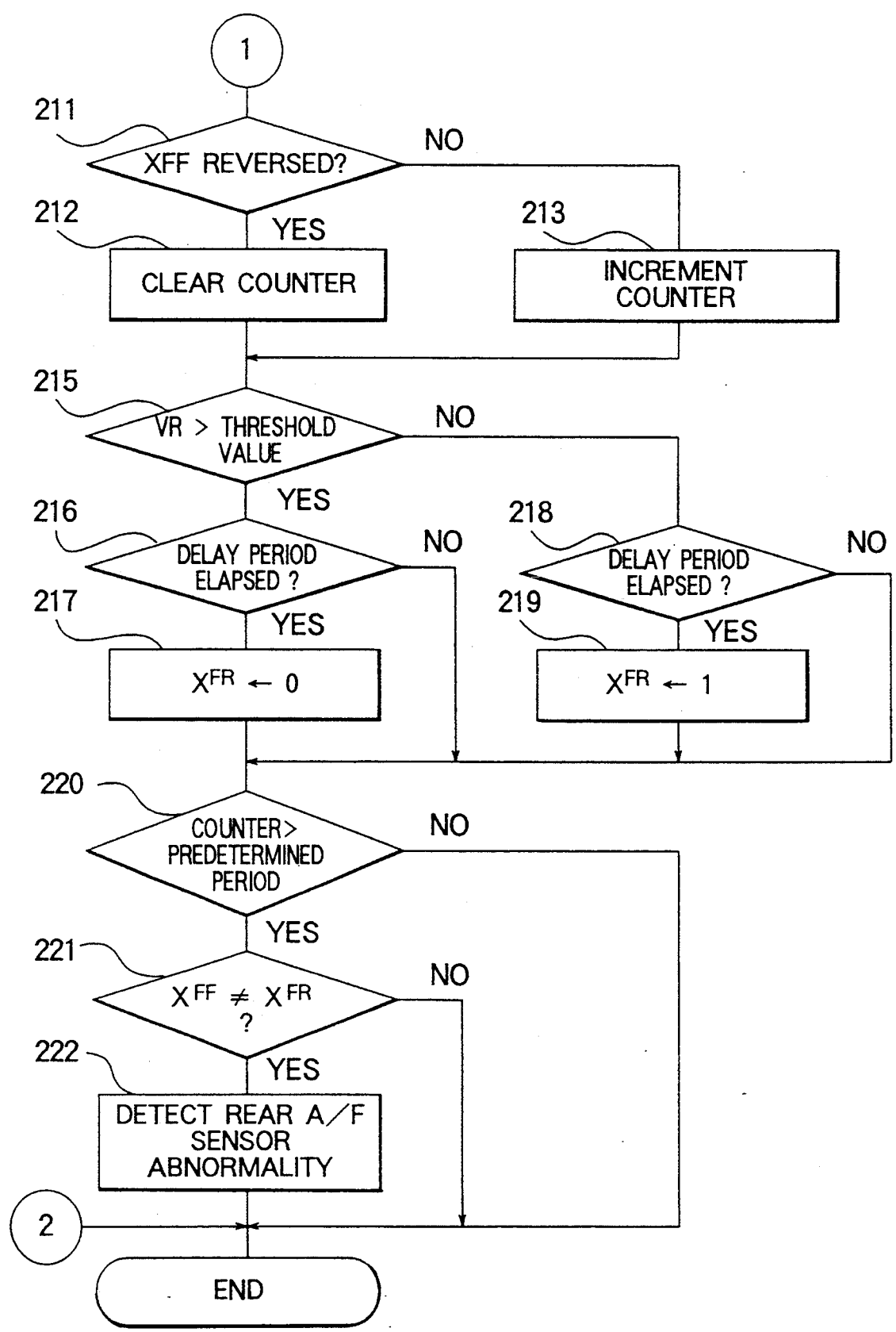
FIG. 6 is a flowchart of a rear half of the sensor abnormality detecting routine.
Figure 13:
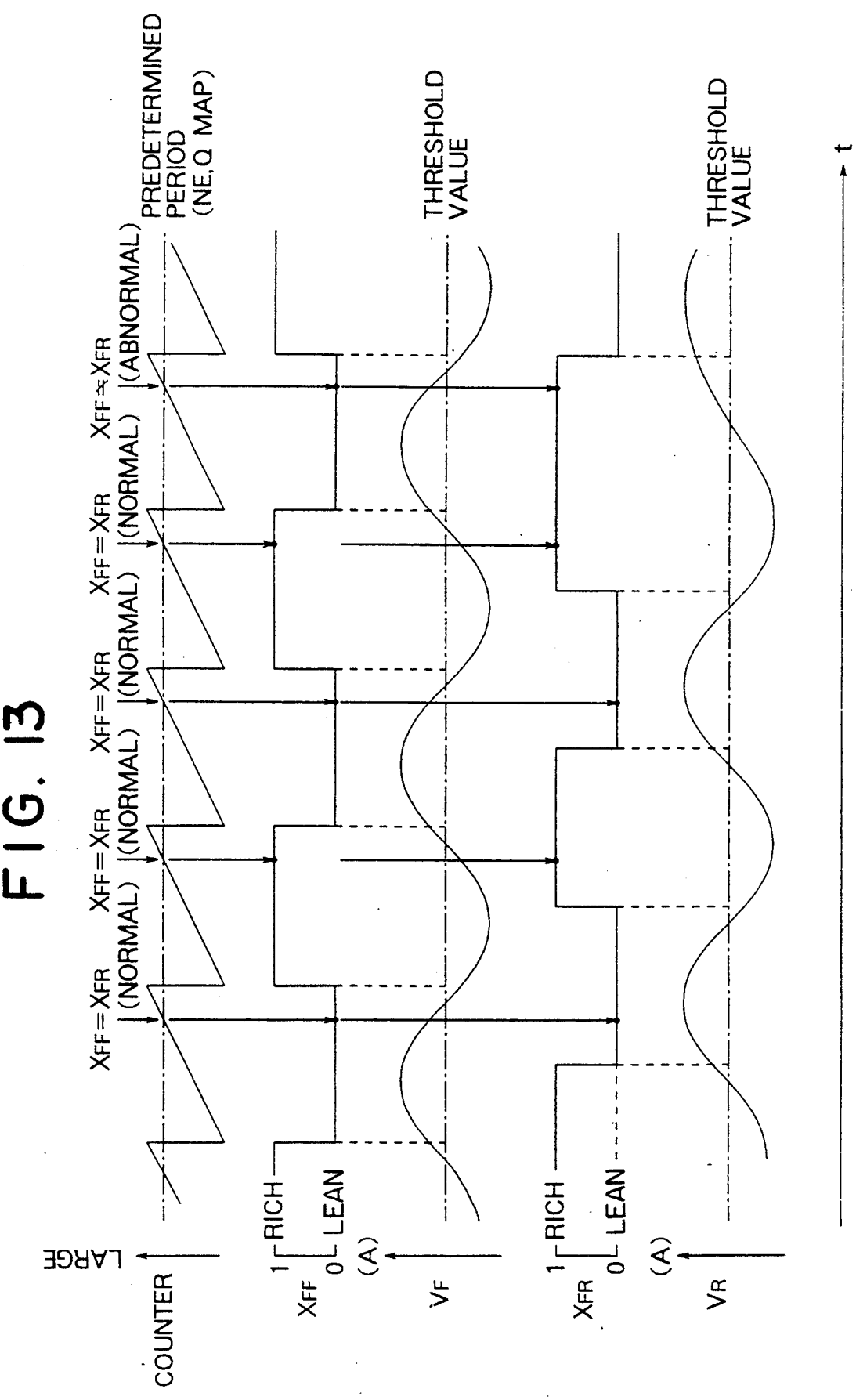
FIG. 13 is a timing chart showing values OI a counter, sensor outputs VF and VR, rich flags XFF and XFR upon abnormality detection control.

The operation of the shown embodiment will be discussed with reference to the drawings. FIGS. 5 and 6 show a sensor abnormality detecting routine to be executed by the control circuit 20, which routine is executed every 128 msec. FIG. 13 is a timing chart showing values of a counter, sensor outputs VF, VR and rich flags XFF, XFR discussed later.

At a step 201, the engine speed NE, the intake air flow rate Q, the engine coolant temperature THW, a vehicle speed SPD, A/D converted upstream side linear air/fuel ratio sensor output VF and downstream side linear air/fuel ratio sensor output VR are input. Subsequently, at a step 201a, a normality judgement of the sensor element of the upstream side air/fuel ratio sensor 16 is performed and at a step 201b, a normality judgement of the front heater is performed. When positive judgement can be made in both steps, namely when judgement is made that both of the upstream side sensor element and the front heater are in normal states, process is advanced to a step 202. At the step 202, when a lean feedback (front lean F/B) of the upstream side air/fuel ratio sensor 16 is permitted (step 202: YES), the front lean F/B is performed at a step 203. It should be noted that when the result of a judgement is negative either at the steps 201a and 201b, namely when either the upstream side sensor element or the front heater is in an abnormal state, the shown routine is terminated without executing the subsequent processes.

Here, discussion will be given for lean F/B. The lean F/B is to control the air/fuel ratio (A/F) toward the lean side relative to the stoichiometric air/fuel ratio. In the F/B control, a threshold value of a given voltage is provided so as to perform proportional and integral control depending upon higher and lower of sensor output voltage with respect to the threshold value. At this time, the threshold value is adjusted to an arbitrary target lean air/fuel ratio by varying operation parameters, such as the engine speed NE, the intake air flow rate Q and so forth.

On the other hand, in the shown embodiment, the lean F/B is performed while employing the linear air/fuel ratio sensor. Since the linear air/fuel ratio sensor varies the output voltage linearly corresponding to the air/fuel ratio in a predetermined range, a stable lean condition can be realized by setting the threshold value at a value corresponding to about A/F=23~24, for example. In case of a sensor which can only generate output voltages variable only depending upon the lean side and rich side of the air/fuel ratio with respect to the stoichiometric air/fuel ratio, only the lean side or rich side of the air/fuel mixture can be judged, and this is difficult to stably maintain the lean state. Therefore, in the present invention, the linear air/fuel ratio sensor is employed.

Here, further detailed discussion will be given for front lean F/B process executed at the step 203 with reference to FIG. 7.

At a step 301, a target air/fuel ratio is derived on the basis of operation parameters, such as the engine speed NE, the intake air flow rate Q and so forth. At a step 302, a predetermined voltage threshold value corresponding to the target air/fuel ratio is set. Subsequently, at a step 303, an integral components IR and IL and a proportional components PR and PL are set from the operation parameters. Then, at a step 304, the upstream side air/fuel ratio output VF is compared with the threshold value set at the step 302 to make a judgement that the air/fuel ratio is leaner than the target air/fuel ratio when the upstream side linear air/fuel ratio sensor output VF is greater than the threshold value, and is richer than the target air/fuel ratio when the upstream side linear air/fuel ratio sensor output VF is smaller than the threshold value.

When a leaner air/fuel ratio relative to the target air/fuel ratio is judged (step 304: YES), a checking routine is performed to determine whether a predetermined period is elapsed (lean condition is maintained for the predetermined period) at a step 305. If the predetermined period is elapsed (step 305: YES), the upstream side sensor rich flag XFF is cleared at a step 306. On the other hand, when the predetermined period is not elapsed (step 305: NO), an integral control is performed through steps 321-323. The integral control will be discussed later.

After clearing the upstream side sensor rich flag XFF at the step 306, reversal of the rich flag XFF (XFF=1→0) is checked at a step 307. If reversal is detected (step 307: YES), a proportional control is performed through steps 208-310 (proportional control will be discussed later), and if reversal is not detected (step 307: NO), the integral control is performed through the steps 312-323.

On the other hand, when judgement is made that the air/fuel ratio is richer than the target air/fuel ratio at the step 304 (step 304: NO), similarly to the case that the leaner air/fuel ratio is judged, a check is performed to determine whether a predetermined period has elapsed (whether the richer air/fuel ratio is maintained for the predetermined period) at a step 331. If the predetermined period has elapsed (step 331: YES), the upstream side sensor rich flag XFF is set at a step 332. On the other hand, if the predetermined period has not elapsed (step 307: NO), the integral control is performed through the steps 321-323.

After setting the upstream side sensor rich flag XFF at the step 332, the process is advanced to step 307 for checking reversal of the rich flag XFF (XFF=0→1). If reversal is detected, the proportional control is performed through the steps 308-310 and otherwise the integral control is performed through the steps 321-323.

Next, the proportional control through the steps 308-310 will be discussed. The proportional control is performed upon reversal of the upstream sensor rich flag XFF. Namely, proportional control is permitted when the upstream side linear air/fuel ratio sensor output VF varies from a smaller state to a greater state with respect to the threshold value (rich-lean) or from the greater state to the smaller state (lean-rich), and the predetermined period is sufficient to judge the variation with certainty.

In the process of the proportional control, at first, the upstream side sensor rich flag XFF is checked for adding or subtracting a proportional component to or from F/B correction coefficient FAF, at a step 308. In case of the rich flag XFF=0 (step 308: YES), the air/fuel ratio is in the lean state and therefore, the proportional component PR is added to the F/B correction coefficient FAF (rich skip). On the other hand, if the rich flag XFF=1 (step 308: NO), the air/fuel ratio is in the rich state and therefore, the proportional component PL is subtracted from the F/B correction coefficient FAF (lean skip).

On the other hand, when proportional control is not effected, integral control (steps 321-323) is performed. When the predetermined period is not elapsed in the judgement process at the steps 305 and 331 to determine whether the predetermined period has elapsed, the rich flag XFF is not switched and thus is maintained in the state judged in the preceding cycle (XFF=0 or XFF=1) of the F/B routine. Therefore, if the rich flag XFF=0 (step 321: Yes), judgement is made that the air/fuel ratio is maintained in the lean state, the integral component IR is added to the F/B correction coefficient FAF at the step 322. On the other hand, if the rich flag XFF=1 (step 321: NO), judgement is made that the air/fuel ratio is maintained in the rich state, the integral component IL is subtracted from the F/B correction coefficient FAF.

On the other hand, when the predetermined period is elapsed in the judgement process (the steps 305 and 331) to determine whether the predetermined period has elapsed, after switching of the rich flag XFF (steps 306, 332), reversal of the rich flag XFF is checked (step 307). If the rich flag XFF is reversed, the foregoing proportional control is performed (steps 308-310). If the rich flag XFF is not reversed, it means that the air/fuel ratio is stable at the rich or lean state, and addition of the integral component IR or subtraction of the integral component IL is performed (steps 321-323) depending upon the state of the rich flag XFF (0 or 1). By this proportional and integral control, the air/fuel ratio is controlled toward an arbitrary target air/fuel ratio at the lean side relative to the stoichiometric air/fuel ratio.

Here, general operation in calculating the fuel injection pulse width TAU with taking the F/B correction coefficient FAF at the steps 309, 310, 322, 323 will be discussed. The fuel injection pulse width TAU is calculated by CPU 103 through the following equation.

$$TAU = TAUE + TAUV$$

wherein, TAUV is a value for compensating a mechanical delay in a fuel supply means including the fuel injection valve 8 as a primary component, and TAUE is generally expressed by the following equation.

$$TAUE = TP \times FEFI \times FAF$$

wherein, TP is a basic fuel injection period to be calculated by CPU 103 on the basis of the intake air flow rate Q from the air flow meter 3 and the engine speed NE and information from other sensors, FEFI represents various correction coefficients depending upon various engine operating conditions, such as engine warming-up state (warming-up after cranking), driving condition (acceleration state, high load state) or so forth.

The F/B correction coefficient FAF is for effecting correction to adjust the air/fuel ratio toward the target air/fuel ratio including the stoichiometric air/fuel ratio. The operation will be hereinafter discussed in connection with the F/B correction coefficient. F/B correction coefficient FAF is a coefficient to be derived through processing, such as proportioning process, integration process, or the like, for the wave shape of sensor output signal on the basis of the output of the air/fuel ratio sensor arranged in the exhaust system and to be multiplied with the basic fuel injection period.

Here, assuming that the result of calculation indicates a 10% increase needed in the period in order to achieve the target air/fuel ratio, correction for the basic fuel injection period TP may be performed by setting the F/B correction coefficient FAF=1.1. It should be noted that in less proportional control and integral control are used in combination for effecting correction, overshooting or delay in response or so forth may be caused.

It is desirable to effect correction with the F/B correction coefficient FAF during a relatively stable engine operating condition other than the conditions of the fuel enrichment state, leaning state or fuel cutoff state to significantly vary the air/fuel ratio, as in the states detected through steps 301–309.

In the shown embodiment, the lean F/B is performed with employing the linear air/fuel ratio sensor. Since the linear air/fuel ratio sensor varies the output voltage linearly corresponding to the air/fuel ratio in a predetermined range, a stable lean condition can be realized by setting the threshold value at a value corresponding to about A/F=23–24, for example. In case of the sensor which can only generate output voltages variable only depending upon lean side and rich side of the air/fuel ratio with respect to the stoichiometric air/fuel ratio, only the lean side or rich side of the air/fuel mixture can be judged, and this is difficult to stably maintain the lean state. Therefore, in the present invention, the linear air/fuel ratio sensor is employed.

Returning to the discussion for operation of the shown embodiment, in FIG. 5, at subsequent steps 204 and 205, when a lean F/B (rear lean F/B) on the basis of the output of the downstream side air/fuel ratio sensor positioned at downstream of the catalytic converter is permitted, rear lean F/B is performed. Then, the process is advanced to a step 206.

Figure 8:
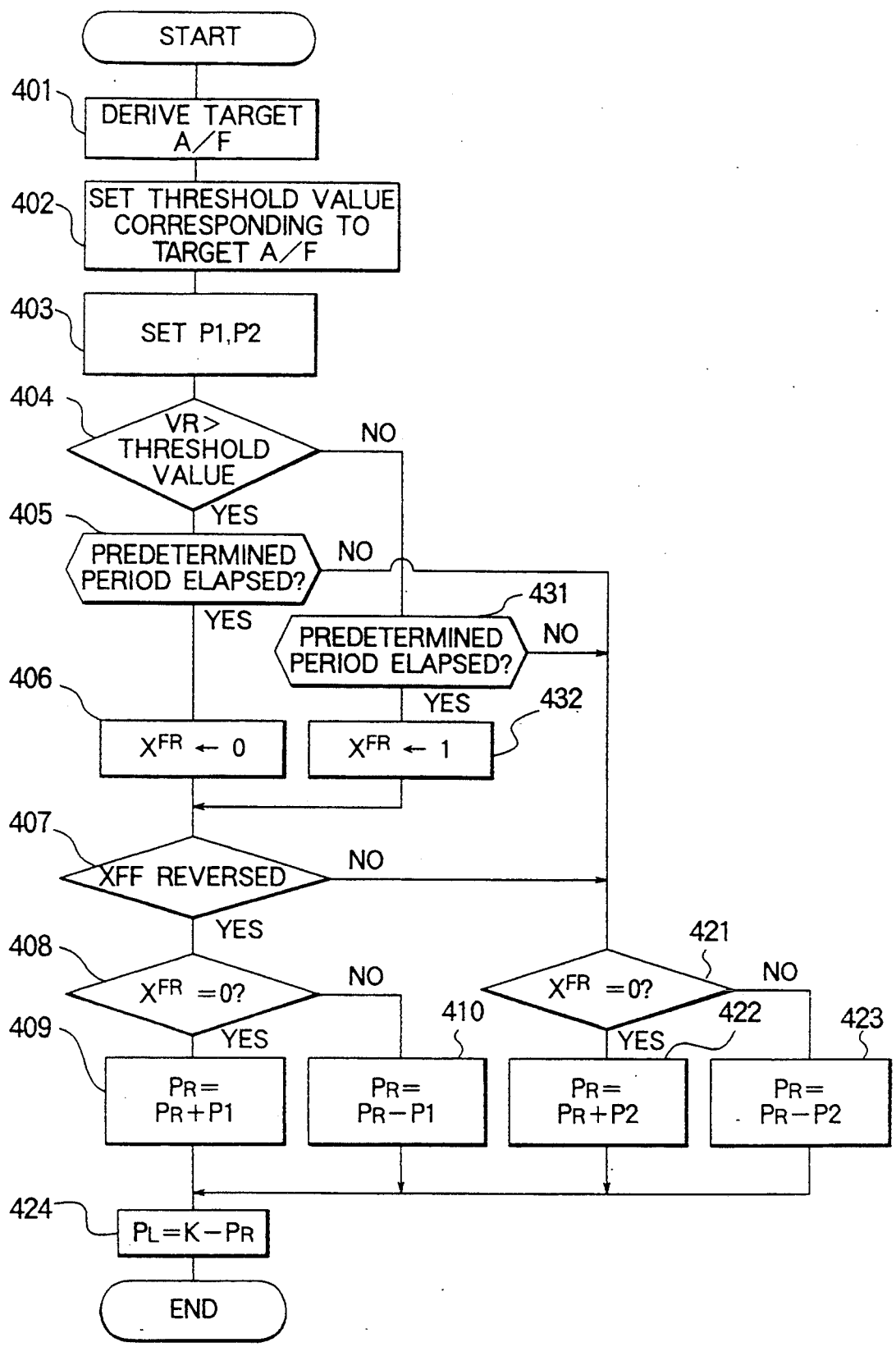
FIG. 8 is a flowchart of a rear lean F/B process to be executed at a step 205 of FIG. 4.

Here, a detailed discussion will be given for the rear lean F/B process to be executed at the step 205 with reference to FIG. 8. For the portion similar to the front lean F/B process, merely brief discussion will be given.

At first, a target air/fuel ratio is calculated at a step 401. At a step 402, a voltage threshold value 402 corresponding to the target air/fuel ratio is set. At a subsequent step 403, constants P1 and P2 are set on the basis of operation parameters. At a step 404, the downstream side air/fuel ratio sensor output VR is compared with the threshold value set at the step 402. When the downstream side air/fuel ratio sensor output VR is greater than the threshold value, judgement is made that the air/fuel ratio is lean with respect to the target air/fuel ratio, and when the downstream side air/fuel ratio sensor output VR is smaller than the threshold value, judgement is made that the air/fuel ratio is rich with respect to the target air/fuel ratio.

When judgement is made that the air/fuel ratio is lean relative to the target air/fuel ratio (step 404: YES), a check is performed to determine whether a predetermined period has elapsed (lean state is maintained for the predetermined period) at a step 405. If the predetermined period has elapsed (step 405: YES), the downstream side sensor rich flag XFR is cleared. On the other hand, if the predetermined period has not elapsed (step 405: NO), process in steps 421–423 is performed.

Discussing the process of the steps 421–423, at step 421, a check is performed to determine whether the rich flag XFR=0 or not. If XFR=0 (step 421: YES), the constant P2 is added to the proportional component PR at step 422. On the other hand, if XFR=1 (step 421: NO), the constant P2 is subtracted from the proportional component PR at a step 423.

After clearing the downstream side sensor rich flag XFR at the step 406, reversal of the rich flag XFR (XFR=1→0) is checked at a step 407. If the reversal is detected (step 407: YES), the process through steps 408–410 (this process will be discussed later) is performed. On the other hand, if reversal is not detected, the process through the steps 421–423 is performed.

Here, discussion will be given for the process through the steps 408–410. At step 408, a check is performed to determine whether the rich flag XFR=0 or not. If XFR=0 (step 408: YES), the constant P1 is added to the proportional component PR at step 409. On the other hand, if XFR=1 (step 408: NO), the constant P1 is subtracted from the proportional constant PR at step 410.

Returning to step 404, when the air/fuel ratio is judged as being rich relative to the target air/fuel ratio (step 404: NO), similarly to the preceding case, judgement is made as lean as mentioned above, and a check is performed to determine whether the predetermined period has elapsed (rich state is maintained for the predetermined period) or not at a step 431. If the predetermined period has elapsed (step 431: YES), the downstream side sensor rich flag XFR is set at a step 432. On the other hand, if the predetermined period has not elapsed (step 432: NO), the process through the steps 421–423 is performed.

After setting the downstream side sensor rich flag XFR at the step 432, the process is advanced to step 407 for checking reversal of the rich flag XFR (XFR=0→1). If reversal is detected, the process through the steps 408–410 is performed and if reversal is not detected, the process through the steps 421–423 is performed.

After correcting the proportional component PR through the process of the steps 409, 410, 422, 423, the process is advanced to a step 424 to subtract the proportional component PR for rich air/fuel ratio from a predetermined value K for deriving the proportional component PL for lean air/fuel ratio. Then, the shown routine goes END.

In the foregoing discussion, the constant P1 is added or subtracted depending upon the value of the rich flag XFR through the process of the steps 408–410 and the constant P2 is added or subtracted depending upon the value of the rich flag XFR. Additional discussion will be given for these two constants P1 and P2.

Figure 7:
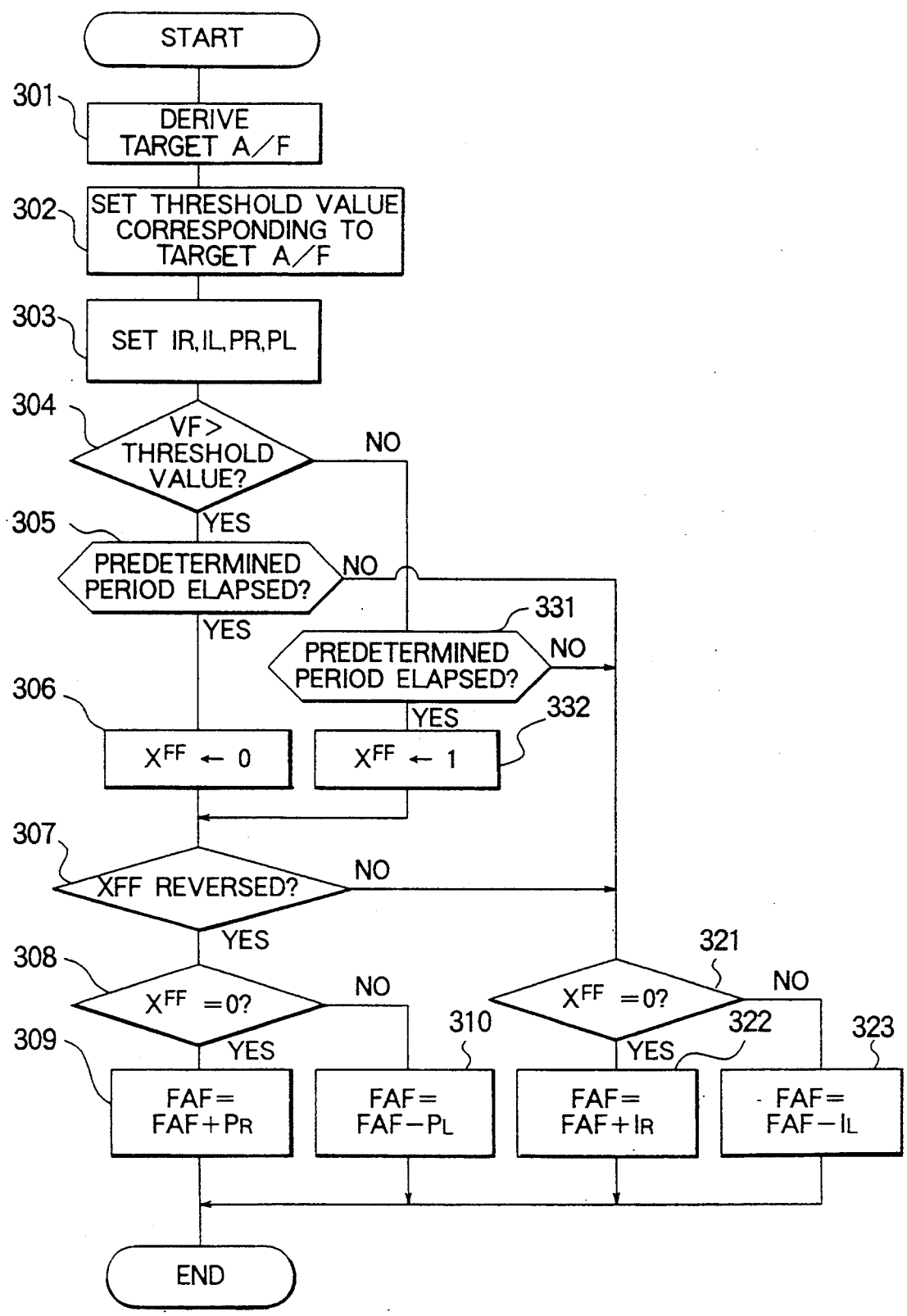
FIG. 7 is a flowchart of a front lean F/B process to be executed at a step 203 of FIG. 4.

Conceptually, the process through the steps 408–410 corresponds to the proportional control in the front lean F/B process through steps 308–310 in FIG. 7, and the process through the steps 421–423 corresponds to the integral control in the front lean F/B process through steps 321–323. Accordingly, as in the relationship between the proportional component PR and the integral component IR to be added and subtracted in the front lean F/B process, the constant P1 is set to be much greater than P2.

Returning to FIG. 5, at a step 206, the upstream side linear air/fuel ratio sensor output VF is compared with the given threshold valve. If a condition (i.e. VF is greater than the threshold value) is satisfied, check is performed if a predetermined delay period is elapsed at a step 207. If the delay period is elapsed, the air/fuel ratio is judged as lean relative to the target air/fuel ratio to clear the upstream side sensor rich flag XFF (XFF←0) at a step 208, and then the process is advanced to a step 211 (FIG. 6). On the other hand, when the delay period is not elapsed at the foregoing step 207, the process is simply advanced to the step 211.

On the other hand, when the condition is not satisfied at the step 206 (i.e. VF is smaller than or equal to the threshold value), a check is performed to determine whether the predetermined delay period has elapsed or not at a step 209. If the delay period has elapsed, judgment that the air/fuel ratio is rich relative to the target air/fuel ratio to set the upstream side sensor rich flag XFF at a step 210 and then the process is advanced to the step 211. On the other hand, when the delay period has not elapsed, the process is simply advanced to the step 211.

Next, at the step 211, check is performed whether the rich flag XFF is reversed from the status checked in the preceding cycle of execution of the routine. If the reversal is detected, a counter is cleared at a step 212. On the other hand, if the reversal is not detected, judgement is made that rich state or lean state of the air/fuel ratio is maintained, and then the counter is incremented at a step 213. Then, the process is advanced to a step 215.

On the other hand, when the front or rear lean F/B based on the output of the linear air/fuel ratio sensor 16 or 18 is not permitted at the step 202 or 204, the counter is cleared at a step 214 and then process simply goes END.

Subsequent processes through the steps 215 to 219 (FIG. 6) is similar to the steps 206–210. At first, at a step 215, the downstream side linear air/fuel ratio sensor output VR is compared with the given threshold valve. If a condition (i.e. VR is greater than the threshold value) is satisfied, a check is performed if a predetermined delay period has elapsed at a step 216. If the delay period has elapsed, the air/fuel ratio is judged as lean relative to the target air/fuel ratio to clear the downstream side sensor rich flag XFR (XFR←0) at a step 217, and then the process is advanced to a step 220. On the other hand, when the delay period has not elapsed at the foregoing step 216, the process is simply advanced to the step 220.

On the other hand, when the condition is not satisfied at the step 215 (i.e. VR is smaller than or equal to the threshold value), a check is performed to determine whether the predetermined delay period has elapsed or not at a step 218. If the delay period has elapsed, judgment that the air/fuel ratio is rich relative to the target air/fuel ratio to set the downstream side sensor rich flag XFR at a step 219 and then the process is advanced to the step 220. On the other hand, when the delay period has not elapsed, the process is simply advanced to the step 220.

At the step 220, the counter value is compared with a predetermined period. The predetermined period corresponds to a possible gas transmission delay period from the upstream side air/fuel ratio sensor 16 and the downstream side air/fuel ratio sensor 18 (which is determined with reference to a map established in terms of the engine speed NE and the intake air flow rate Q). When the counter value exceeds the predetermined period, a check is performed to determine whether the states of the upstream side sensor rich flag XFF and the downstream side sensor rich flag XFR are different or not at a step 221. If the states of both rich flags XFF and XFR are different (step 221: YES), judgement is made that the downstream side air/fuel ratio sensor 18 is in an abnormal state at a step 222. On the other hand, when the states of both flags XFF and XFR are the same, process goes END without performing an abnormality check.

The normality check of the sensor element (front element) of the upstream side air/fuel ratio sensor 16 in the above-mentioned step 201a (FIG. 5), and the normality check for the front heater at the step 201b are performed by reading in the results of judgment through other routines. The process of a routine for the normality check will be discussed hereinbelow.

At first, a routine for normality check for the front element will be discussed with reference to FIGS. 9–11. Steps 501–508 are steps for processing various judgements.

At the step 501, a check is performed to determine whether the engine is in a cranking state or not. More specifically, the engine speed NE is checked to determine whether it is lower than or equal to 400 r.p.m., for example. If 400 r.p.m. is exceeded, judgement is made that the engine is not in the cranking state.

At a step 502, a judgement is made to determine whether a high load enrichment correction in fuel supply is effected or not. The high load enrichment correction is a correction for air/fuel ratio to be controlled for assuring engine output or for air fuel ratio to be controlled for suppressing overheating of the exhaust temperature, namely an enrichment correction for establishing a richer air/fuel ratio than the stoichiometric air/fuel ratio. In this step, a determination of whether the enrichment correction is effected is checked by a flag (XOTP) or so forth. When the high load enrichment correction flag is not set, the process is advanced to a step 503.

At the step 503, a check is performed for a light load condition, such as that during deceleration. When the calculated value of the fuel injection pulse width TAU output to the fuel injection valve 8 is in excess of a predetermined value (e.g. 0.7 msec.), judgement is made that a predetermined condition is satisfied (positive judgement), namely not in the deceleration state. Then, the process is advanced to a step 504.

At step 504, a check is made to determine whether a reduction of fuel supply amount is not effected upon resumption of fuel supply from the fuel cut-off state. The reduction of the fuel supply amount upon resumption from the fuel cut-off state is effected in an extent of about 20% in order to reduce a torque shock, and subsequently the fuel amount is corrected to the not reduced amount in time attenuation. If the engine is not in the fuel cut-off state, the process is advanced to a step 505.

At step 505, a check is performed to determine whether the engine is in the fuel cut-off state at a high engine speed. The fuel cut-off state at a high engine speed is effected for protecting the engine from over-revolution. For instance, when the engine speed exceeds 6400 r.p.m., fuel cut-off is effected in order to protect the engine. Once the engine speed is dropped down to 6000–6200 r.p.m., fuel supply is resumed. This condition is judged based on a flag (XFCNE1). If the fuel cut-off at the high engine speed is not effected, the process is advanced to a step 506.

At step 506, a check is performed to determine whether the engine is in the driving condition where a given period is elapsed after resumption from the fuel cut-off state. That is, a check is performed to determine whether 0.7 sec. or longer period has elapsed after resumption from fuel cut-off. If the given period has elapsed, the process is advanced to a step 507. This step 506 is performed to make further certain of the judgement at the steps 504 and 505.

At step 507, a judgement is made to determine whether the intake air flow rate Q is greater than a predetermined value for further judgement of whether the engine is in decelerating as checked at the step 503. When the intake air flow rate Q is greater than the predetermined value, the process is advanced to a step 508.

At step 508, a judgement is made to determine whether the front heater incorporated in the upstream side linear air/flow ratio sensor 16 operates in the normal state or not. The normality judgement for the front heater is performed after the normality judgement routine for the front element. However, in the initial state, the front heater is judged as normal and continuously judged as normal unless abnormality of the heater is judged.

When all conditions through the steps 501–508 are satisfied, namely, positive judgements are made at all steps, the process is advanced to a step 509 to set a flag XJLNSR (=1). Then, the process is further advanced to a step 511 (FIG. 10). On the other hand, when any one of the conditions in the steps 501–508 is not satisfied, namely, a negative judgement is made at any one of the steps, judgement is made that a condition for effecting an air/fuel ratio feedback correction is not satisfied. Then, the flag XJLNSR is reset (=0) at a step 510 and the process is advanced to the step 511. It should be appreciated that when the process in the step 509 is performed, namely the condition for the air/fuel ratio feedback correction is satisfied (XJLNSR=1), it means that the engine is not in the operational state, such as fuel enrichment, fuel reduction or fuel cut-off, causing significant variation of the air/fuel ratio.

Subsequent process through steps 511–523 is a process for making a judgement as to whether the front element is in a normal state or not.

At step 511, the flag XJLNSR is checked to determine whether it is set (=1) or not. When the negative judgement is made (i.e. XJLNSR=0), the process directly goes to END. On the other hand, when the flag XJLNSR is set (step 511: YES), the following judgement process through steps 512–519 is performed.

At the step 512, judgement is made whether the engine is in completely warmed-up state or not. In practice, a completely warmed-up condition of the engine is judged when the engine coolant temperature THW is higher than or equal to a predetermined value (e.g. 80° C.). When the engine coolant temperature THW is higher than or equal to the predetermined value, the process is advanced to the step 513 as a condition is satisfied.

At step 513, a check is made to determine whether a ground total value ΣQ of the intake air flow rate Q is greater than or equal to a predetermined value or not. This process is to estimate the exhaust temperature from the ground total value ΣQ of the intake air flow rate Q and to make a judgement as to whether the exhaust temperature around the air/fuel ratio sensors disposed in the exhaust passage has reached a temperature for stably active state of the sensors. If the ground total value ΣQ is greater than or equal to the predetermined value, the process is advanced to the step 514 as a condition is satisfied.

At step 514, a check is made to determine if a period of fuel cut-off in the past 3 min. is shorter than a predetermined period. This process is employed to check lowering of the exhaust temperature by repeatedly effecting fuel cut-off after relatively long period is elapsed after the ground total value ΣQ of the intake air flow rate Q satisfies the condition at the step 513. In practice, when the fuel cut-off period in the past 3 min. is less than 18 sec., the process is advanced to the step 515 as a condition is satisfied.

At step 515, judgement is made as to whether the vehicle speed SPD is lower than a predetermined value. For instance, when the vehicle speed is lower than 100 km/h, the process is advanced to the step 516 as a condition is satisfied.

At step 516, a normality check for the vehicle speed sensor 30, the engine coolant temperature sensor 13, and the air flow meter 3 is effected. If abnormality is not detected by any sensor, the process is advanced to the step 517 as a condition is satisfied. This process is for confirmation that the judgement of conditions made in the preceding steps is not based on abnormality of any sensor.

The subsequent process through steps 517–521 (FIG. 11) is for making judgement for normality of the front element when a sensor current falls within a predetermined range within a predetermined period during the fuel cut-off state and for abnormality of the front element when the sensor current is out of the predetermined range. At first, a check is performed to determine if the current engine driving condition is in the fuel cut-off state. If the fuel cut-off state is detected, the process is advanced to the step 518 as a condition is satisfied.

Next, at the step 518, a check is performed to determine whether a predetermined lower limit period has elapsed after initiation of fuel cut-off or not. In practice, when 2 sec. or more has elapsed (continued) from initiation of fuel cut-off, the process is advanced to the step 519 as a condition is satisfied.

At the step 519, a check is performed to determine whether an elapsed period from initiation of fuel cut-off is shorter than a predetermined upper limit period or not. In practice, when the elapsed time from initiation of fuel cut-off is shorter than 5 sec., the process is advanced to the step 520 as a condition is satisfied.

Only when positive judgements are made in all judgement processes through the steps 512–519, process directly relating to judgement for normality or abnormality of the front element through the steps 520–523 is performed. On the other hand, when negative judgment is made at any one of the judgement processes through the steps 512–519, the shown routine is directly goes END.

At the step 520, a check is performed to determine whether the sensor current is greater than or equal to a predetermined lower limit value (e.g. 5 mA) or not. Also, at the step 521, a check is performed to determine whether the sensor current is less than a predetermined upper limit value (e.g. 45 mA). When positive judgements are made at the steps 520 and 521, namely when the sensor current is greater than or equal to 5 mA and less than 45 mA, the sensor current is judged as being a normal current value during the fuel cut-off state.

Therefore, the process is advanced to the step 522 to set a front element normal flag.

On the other hand, when the sensor current is less than 5 mA at the step 520 or is greater than or equal to 45 mA at the step 521, the process is advanced to the step 523 to set the front element abnormal flag. In this case, in order to avoid an erroneous judgement, it is possible not to instantly make abnormality judgement even when the condition is not satisfied (negative judgement is made) at the step 520 or 521 by advancing the process to the step 523, and to make an abnormality judgement only when the sensor current value out of the predetermined range is maintained for a predetermined period of time while the conditions at the steps 516 and 519 are satisfied.

Figure 9:
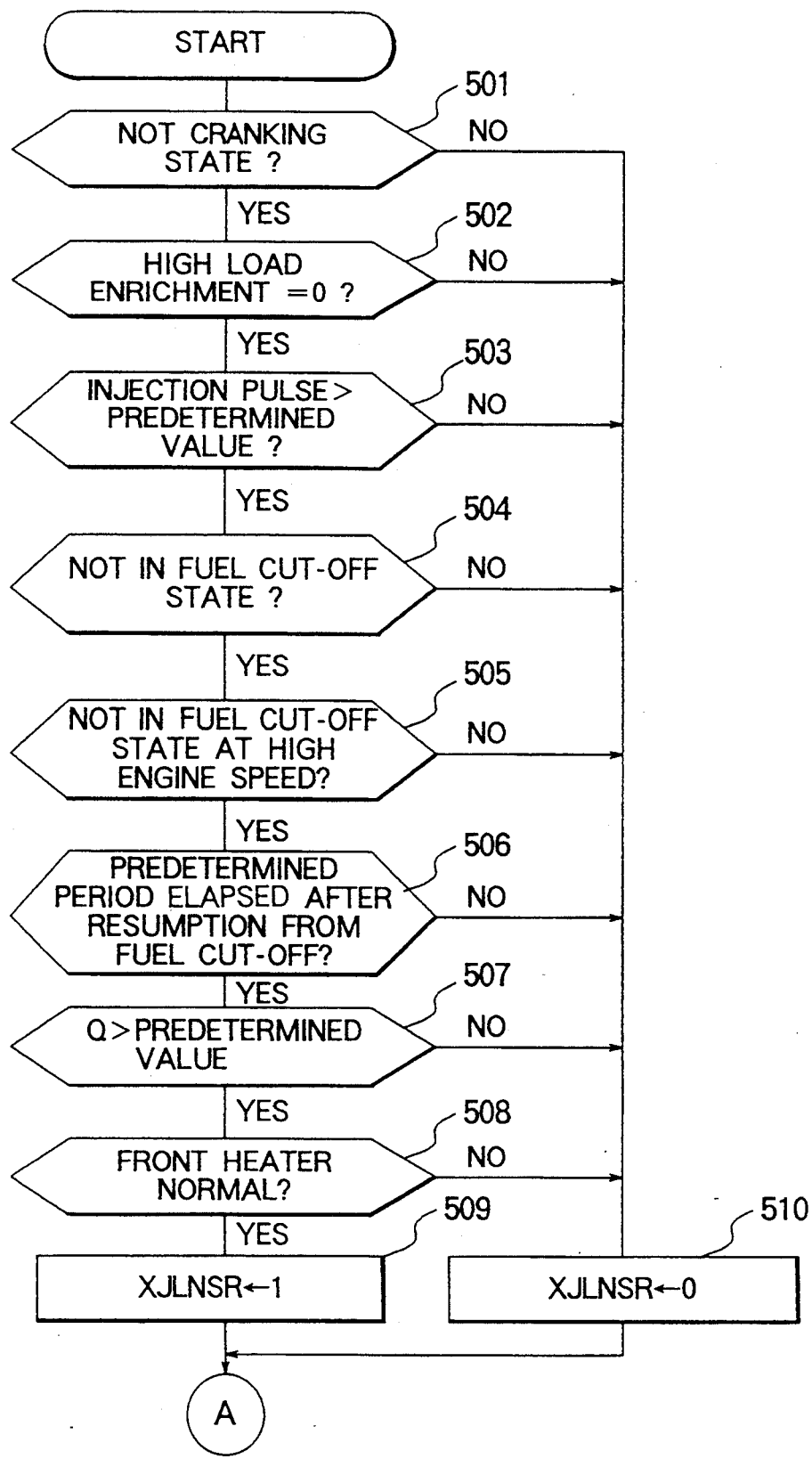
FIG. 9 is a flowchart showing a front portion of a routine for making a judgement as to whether an element of an upstream side air/fuel ratio sensor is in a normal state or not.
Figure 10:
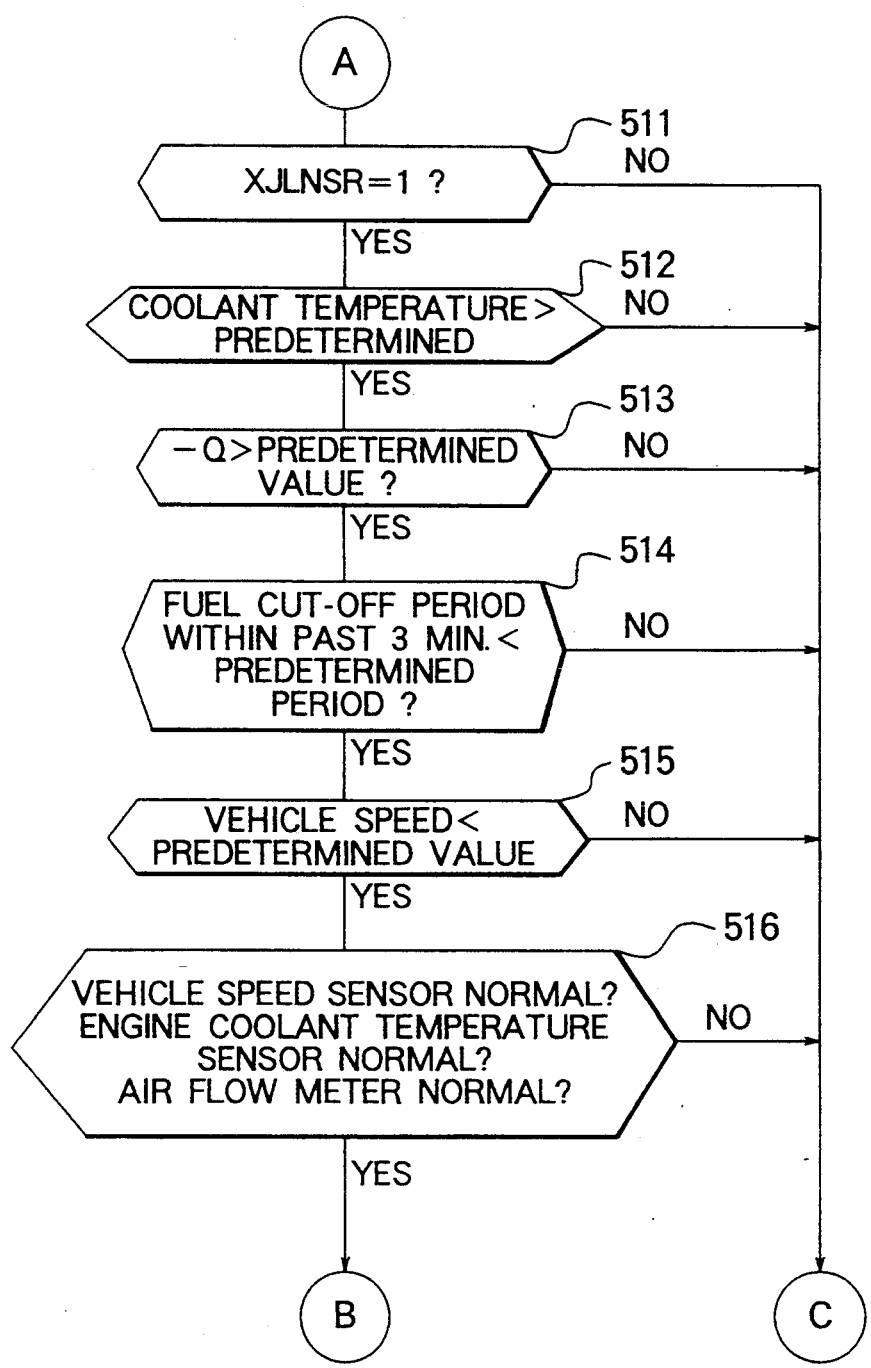
FIG. 10 is a flowchart showing an intermediate portion of a routine for making a judgement as to whether an element of an upstream side air/fuel ratio sensor is in a normal state or not.
Figure 11:
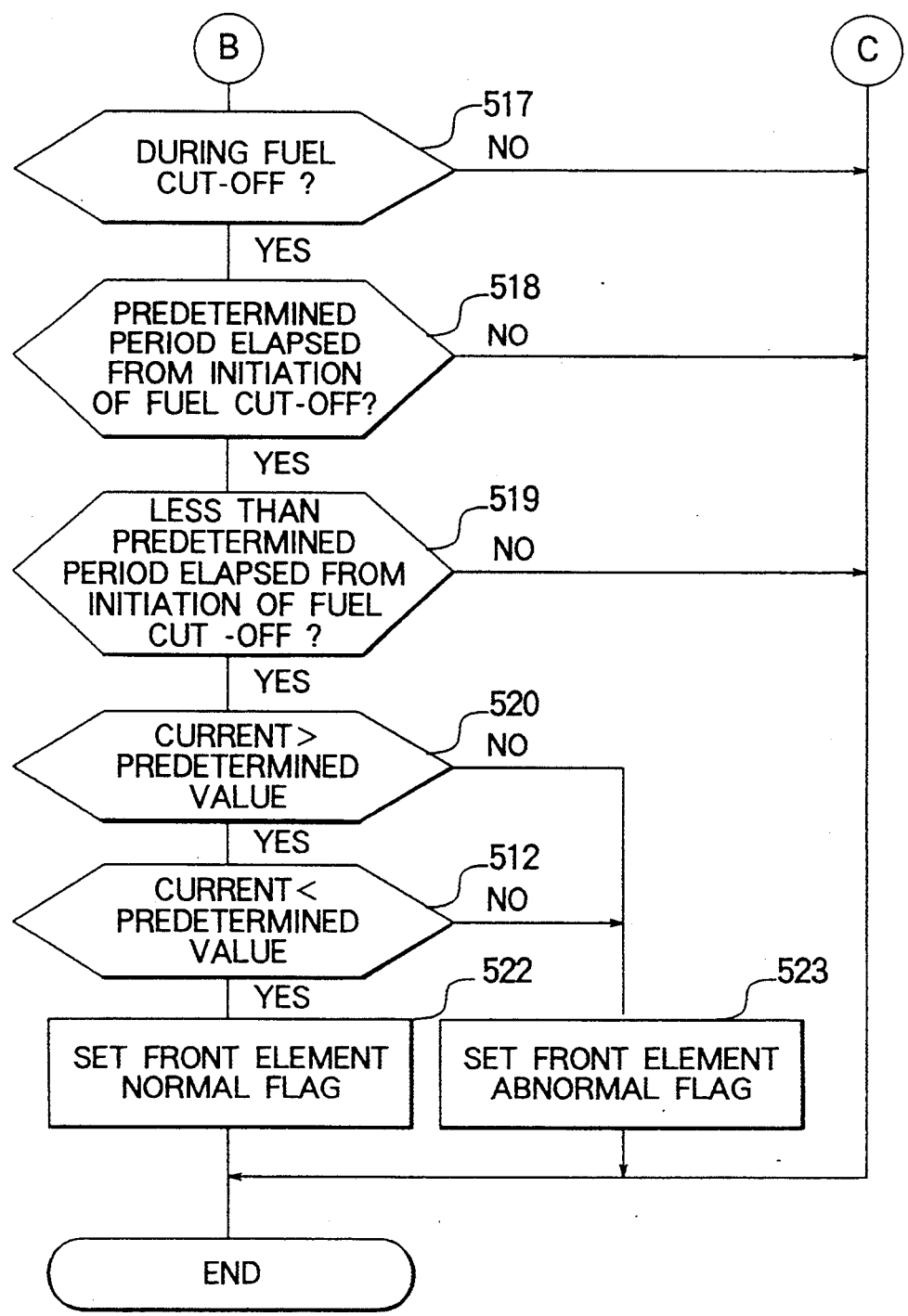
FIG. 11 is a flowchart showing a rear portion of a routine for making a judgement as to whether an element of an upstream side air/fuel ratio sensor is in a normal state or not.

In the front element normality judgement routine illustrated in FIGS. 9–11, the steps 501–510 are a process for making a judgement for the air/fuel ratio feedback effecting condition, steps 511–516 are a process for making a judgement for a sensor abnormality judgement condition including the air/fuel ratio feedback effecting condition, and steps 517–521 are a process for making a judgement as to whether the front element is in normal state or abnormal state based on the period and sensor current.

Figure 12:
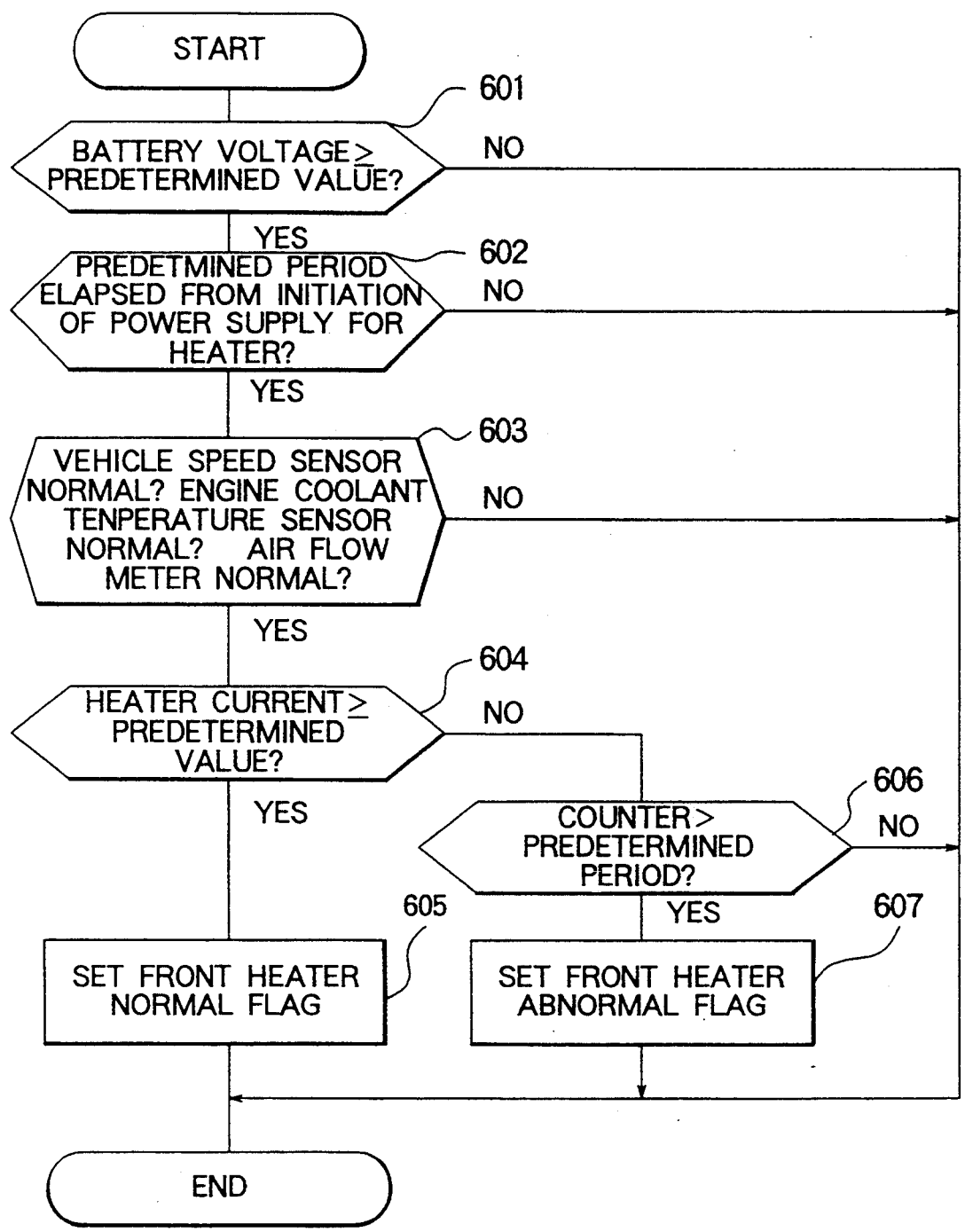
FIG. 12 is a flowchart showing a routine for making a judgement as to whether a front heater is in a normal state or not.

Next, discussion will be given for a routine which makes a judgement as to whether the front heater is in normal state or not with reference to FIG. 12.

A process in step 601 confirms the normal operating state of the front heater by reading the voltage value of the battery 40 as the power source for the front heater. In practice, when the battery voltage is higher than or equal to a predetermined value (e.g. 12 V), the power source for the heater is judged as normal to advance the process to a step 602.

At step 602, a check is performed to determine whether a predetermined period is elapsed after initiation of power supply for the front heater. In practice, 2 msec., for example, is elapsed from initiation of power supply, and the process is advanced to a step 603 as a condition is satisfied. It should be appreciated that the power supply condition for the heater can be checked by a heater voltage.

At step 603, as the step 516 (FIG. 10) in the front element normality judgement routine set forth above, a normality check for the vehicle speed sensor 30, the engine coolant temperature sensor 13 and the air flow meter 3 is performed. If all sensors are in a normal state, the process is advanced to a step 604 as a condition is satisfied.

Through the process at the steps 601–603, a normality judgement condition for the front heater of the upstream side linear air/fuel ratio sensor is established. If a negative judgement is made at any one of the steps 601–603, the shown routine is instantly goes END. At the subsequent step 604, the front heater is judged if it is in normal state or abnormal state depending upon the magnitude of the heater current.

At the step 604, a judgement is made to determine whether the heater current is greater than or equal to a predetermined value or not. For instance, when the heater current is greater than or equal to 1.5A, the process is advanced to a step 605 to set a front heater normal flag and then the shown routine goes to END. On the other hand, when the heat current is less than 1.5A, the process is advanced to a step 606 to check whether a counter for measuring a period where the heater current is held less than 1.5A, indicates a greater period than a predetermined period in order to avoid an erroneous judgement. If the counter shows the period being shorter than or equal to the predetermined period (step 606: NO), the shown routine directly goes to END. On the other hand, when the counter shows the period being longer than the predetermined period (step 606: YES), the process is advanced to a step 607 to set a front heater abnormal flag, and subsequently the shown routine goes END.

It should be appreciated that the specific values of the sensor current, the heater voltage, the heater current for used for judgement in the front element normality judgement and the front heater normality judgement are significantly variable depending upon the characteristics of the air/fuel ratio sensor or circuit construction. Therefore, the specific numerical values set out above should be understood as mere examples employed in the shown embodiment.

As set forth above, in the engine operating condition where the air/fuel ratio lean F/B based on the outputs of the linear air/flow ratio sensors provided at upstream side and downstream side of the catalytic converter with reduced $O_2$ storage effect of the catalyst, a delay in response at the downstream side linear air/flow ratio sensor 18 becomes substantially the gas transmission delay period between the upstream and downstream side linear air/fuel ratio sensors. Namely, when the elapsed time from reversal of the upstream side sensor rich flag XFF of the upstream side linear air/fuel ratio sensor 16 to reversal of the downstream side sensor rich flag XFR of the downstream side linear air/flow ratio sensor 18 is longer than a possible gas transmission delay period, the deterioration of the downstream side linear air/fuel ratio sensor can be judged.

As set forth, since the delay period is derived on the basis of the results of detection in the upstream and downstream side linear air/fuel ratio sensors in a air/fuel ratio lean range which is not influenced by the $O_2$ storage effect, the derived delay period is not influenced by the deterioration condition of the catalyst so that the abnormality detection for the downstream side linear air/flow rate sensor can be done with a high degree of accuracy. In addition, the linear air/fuel ratio sensors 16, 18 which can linearly detect the air/fuel ratio, stable lean condition can be realized to improve exactness of the abnormality detection.

Although the invention has been illustrated and described with respect to exemplary embodiment thereof, it should be understood by those skilled in the art that the foregoing and various other changes, omissions and additions may be made therein and thereto without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

For instance, although the shown embodiment is constructed to instantly make judgement for abnormality of the downstream side linear air/flow ratio sensor at the step 222 when the states of the rich flags XFF and XFR are different at the step 220, it should be possible to make an abnormality judgement of the downstream side air/flow ratio sensor 18 when the states of the rich flags XFF and XFR are continuously different for a plurality of times in order to avoid an erroneous judgement.

As set forth, according to the air/fuel ratio sensor abnormality detecting device for the internal combustion engine, since the gas response delay period is derived on the basis of the results of detection in the upstream and downstream side linear air/fuel ratio sensors in a air/fuel ratio lean range which is not influenced by the O$_2$ storage effect, the derived delay period is not influenced by the deterioration condition of the catalyst so that the abnormality detection for the downstream side linear air/flow rate sensor can be done with high accuracy. In addition, since the linear air/fuel ratio sensors can linearly detect the air/fuel ratio, stable lean condition can be realized to improve exactness of the abnormality detection.

What is claimed is:

1. In an internal combustion engine having:
 a catalytic converter arranged in an exhaust passage of the internal combustion engine for exhaust purification;
 an upstream side air/fuel ratio sensor arranged in the exhaust passage upstream of said catalytic converter for detecting an air/fuel ratio in the internal combustion engine;
 a downstream side air/fuel ratio sensor arranged in the exhaust passage downstream of said catalytic converter for detecting an air/fuel ratio in the internal combustion engine;
 control means for performing an air/fuel ratio feedback control on the basis of results of detection of both air/fuel ratio sensors,
 an air/fuel ratio sensor abnormality detecting device for detecting abnormality of said downstream side air/fuel ratio sensor comprising:
 linear air/fuel ratio sensors for linearly detecting the air/fuel ratio being employed as said upstream side and downstream side air/fuel ratio sensors;
 delay period deriving means for deriving a gas response delay period between said both air/fuel ratio sensors on the basis of the results of detection of said upstream side and downstream side air/fuel ratio sensors while the air/fuel ratio feedback control is effected under lean condition of the air/fuel ratio; and
 abnormality detecting means for detecting abnormality of said downstream side air/fuel ratio sensor on the basis of the derived delay period.

2. An air/fuel ratio sensor abnormality detecting device as set forth in claim 1, wherein said delay period deriving means includes a counter for measuring an elapsed time from reversal of the output of said upstream side air/fuel ratio sensor from rich to lean.

3. An air/fuel ratio sensor abnormality detecting device as set forth in claim 2, wherein said abnormality detecting means detects abnormality of said downstream side air/fuel ratio sensor when the output of said downstream side air/fuel ratio sensor indicates rich state of the air/fuel ratio when the measured value of said elapsed time measuring counter reaches a predetermined period.

4. An air/fuel ratio sensor abnormality detecting device as set forth in claim 3, wherein said predetermined period is preliminarily determined depending upon an engine operating condition.

* * * * *